United States Patent
Chu et al.

(10) Patent No.: US 7,411,757 B2
(45) Date of Patent: Aug. 12, 2008

(54) DISK DRIVE WITH NONVOLATILE MEMORY HAVING MULTIPLE MODES OF OPERATION

(75) Inventors: Frank R. Chu, Milpitas, CA (US); Richard M. H. New, San Jose, CA (US); Spencer W. Ng, San Jose, CA (US); Motoyasu Tsunoda, Sagamihara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 111 days.

(21) Appl. No.: 11/460,247

(22) Filed: Jul. 27, 2006

(65) Prior Publication Data

US 2008/0024899 A1    Jan. 31, 2008

(51) Int. Cl.
*G11B 15/18* (2006.01)

(52) U.S. Cl. ....................................... 360/69
(58) Field of Classification Search .................. 360/69, 360/55, 31; 711/103, 112, 147, 156, 159; 714/51

See application file for complete search history.

(56) References Cited

U.S. PATENT DOCUMENTS

| | | | |
|---|---|---|---|
| 4,908,793 A | 3/1990 | Yamagata et al. | |
| 5,519,831 A | 5/1996 | Holzhammer | |
| 5,521,772 A | 5/1996 | Lee et al. | |
| 5,550,975 A * | 8/1996 | Ichinomiya et al. | 714/51 |
| 5,570,244 A | 10/1996 | Wiselogel | |
| 5,584,007 A | 12/1996 | Ballard | |
| 5,586,291 A | 12/1996 | Lasker et al. | |
| 5,636,359 A * | 6/1997 | Beardsley et al. | 711/122 |
| 5,860,083 A | 1/1999 | Sukegawa | |
| 5,991,825 A | 11/1999 | Ng | |
| 6,052,789 A | 4/2000 | Lin | |
| 6,243,795 B1 * | 6/2001 | Yang et al. | 711/159 |
| 6,295,577 B1 | 9/2001 | Anderson et al. | |
| 6,418,510 B1 | 7/2002 | Lamberts | |
| 6,429,990 B2 | 8/2002 | Serrano et al. | |
| 6,785,767 B2 * | 8/2004 | Coulson | 711/112 |
| 6,882,489 B1 | 4/2005 | Brunnett et al. | |
| 7,120,759 B2 * | 10/2006 | Chiu et al. | 711/147 |
| 7,136,973 B2 * | 11/2006 | Sinclair | 711/156 |
| 7,318,118 B2 * | 1/2008 | Chu et al. | 711/103 |
| 2004/0064607 A1 | 4/2004 | Odakura et al. | |
| 2005/0251617 A1 * | 11/2005 | Sinclair et al. | 711/103 |
| 2006/0080501 A1 * | 4/2006 | Auerbach et al. | 711/112 |

* cited by examiner

*Primary Examiner*—Fred Tzeng
(74) *Attorney, Agent, or Firm*—Thomas R. Berthold

(57) ABSTRACT

A hybrid disk drive, i.e., a disk drive with two types of permanent storage media (conventional disk media and nonvolatile memory, such as flash memory), uses its nonvolatile memory in operational modes other than the power-save or "standby" mode wherein the disks are spun down. In a first additional mode, called a "performance" mode, one or more blocks of write data are destaged from volatile memory (the disk drive's write cache) and written to the disk and simultaneously one or more data blocks of write data are destaged from the volatile memory and written to the nonvolatile memory. In a second additional mode, called a "harsh-environment" mode, the disk drive includes one or more environmental sensors, such as temperature and humidity sensors, and the nonvolatile memory temporarily replaces the disks as the permanent storage media. In a third additional mode, called a "write-inhibit" mode, the disk drive includes one or more write-inhibit detectors, such as a shock sensor for detecting disturbances and vibrations to the disk drive. In write-inhibit mode, if the write-inhibit signal is on then the write data is written from the volatile memory to the nonvolatile memory instead of to the disks.

17 Claims, 6 Drawing Sheets

DISK DRIVE WITH NONVOLATILE MEMORY HAVING MULTIPLE MODES OF OPERATION

BACKGROUND OF THE INVENTION

1. Field of the Invention

This invention relates generally to disk drives, and more particularly to a magnetic recording disk drive that includes a nonvolatile memory for storing write data.

2. Description of the Related Art

Magnetic recording hard disk drives (HDDs) typically include, in addition to the rotating disk memory, solid state memory (referred to as "cache") that temporarily holds write data transferred from the host computer before it is written to the disks. The conventional cache is dynamic random access memory (DRAM), a volatile form of memory that can undergo a significant number of write/erase cycles and that has a high data transfer rate.

The disk drive's data controller receives the write data from the host and controls the writing to the disks and the DRAM. The transfer of the write data to the DRAM is typically done using one of two conventional methods. In a first method, called "write-back caching" or "write-cache enabled", the block of write data for a write command from the host is stored in DRAM, and write completion is signaled to the host when the block of write data has been received in the DRAM. The block of write data in DRAM is then later destaged from the DRAM and written to the disks. In a second method, sometimes called "write-through caching" or more commonly "write-cache disabled", write completion is signaled to the host only after the block of write data has been written to the disks, using the cache mainly as a speed-matching buffer. Independent of write-cache enabled or disabled, disk drives today also support "command queuing", in which multiple write commands may be received and waiting in a queue in the drive's controller. The controller transfers the blocks of write data for one or more of these waiting commands from the host into the DRAM, and signals write completion if write cache is enabled. If write cache is disabled, the controller then runs a program to determine when and which of the blocks of write data to destage to the disks. Only after a block of write data has been destaged to the disks does the controller signal write completion to the host.

With the advent of mobile computers that are battery powered, some HDDs have a "power-save" or "stand-by" mode wherein the disks spin down (stop rotating) when the drive has been inactive for a period of time. The main purpose of this mode is to extend the battery life of the mobile computer. When a disk drive is in standby mode, with just the electronics active, battery power is conserved. When write data is received from the host and must be written to the disks, the drive exits standby mode and the disks spin up to enable the write data to be written, which consumes a significant amount of battery power. If this occurs too frequently, there is no power saving.

One solution to this problem is to store the write data in the DRAM when the drive is in standby mode and the disks are not rotating, and then destage the write data to the disks at some later time, as in write-cache enabled. However, because DRAM is volatile memory, there is a risk that the write data in the DRAM can be lost if the drive loses power before the write data can be destaged to the disks. Thus it has been proposed to use nonvolatile memory, e.g., "flash" memory, in addition to or in place of DRAM in HDDs used in mobile computers. U.S. Pat. No. 6,295,577 describes a HDD that transfers write data in DRAM to flash memory in the event of a power failure. Because flash memory is nonvolatile, the write data will not be lost if power is lost. This type of HDD is sometimes called a "hybrid" disk drive. Hybrid HDDs use their flash memory for this mode of operation, i.e., the power-save mode. Thus the primary advantage of a hybrid disk drive is the ability to receive write data from the host without having to exit the standby mode, thereby conserving power and extending battery life, but without any risk of losing data in the event of a power failure. Hybrid HDDs also typically use the nonvolatile memory to store the computer's boot-up image so that on startup the boot-up image can be quickly loaded without having to wait for the disks to spin up. Application programs can similarly be stored in the nonvolatile memory of hybrid HDDs for fast application loading.

What is needed is a hybrid disk drive that uses the advantages provided by its nonvolatile memory to operate in modes other than the power-save mode.

SUMMARY OF THE INVENTION

The invention is a hybrid disk drive that uses its nonvolatile memory in operational modes other than the power-save mode. In a first additional mode, called a "performance" mode, one or more blocks of write data are destaged from the volatile memory and written to the disk and simultaneously one or more data blocks of write data are destaged from the volatile memory and written to the nonvolatile memory. This parallel operation in performance mode increases the throughput of moving the write data from the volatile memory into some form of permanent storage media in the disk drive, either disk media or flash memory. In a second additional mode, called a "harsh-environment" mode, the disk drive includes one or more environmental sensors, such as temperature and humidity sensors. Under extreme or harsh environmental conditions, the disk drive's spindle motor and actuator may not be able to operate properly. However, because the nonvolatile memory, such as flash memory, can operate in environmental conditions well beyond the normal operating conditions of a conventional disk drive, the hybrid disk drive is configured to operate in harsh-environment mode when a signal from an environmental sensor is detected. In harsh-environment mode, the nonvolatile memory temporarily replaces the disks as the permanent storage media. In a third additional mode, called a "write-inhibit" mode, the disk drive includes one or more write-inhibit detectors, such as a shock sensor for detecting disturbances and vibrations to the disk drive, for ensuring that during writing of data to the disks the write head will not accidentally overwrite or corrupt data written on tracks adjacent to the intended or target track. In the write-inhibit mode, if the write-inhibit signal is on and write caching is off, the write data is written from the volatile memory to the nonvolatile memory instead of to the disks. This avoids the penalty of waiting for additional disk rotations to attempt writing to the disks when the write-inhibit signal is off.

For a fuller understanding of the nature and advantages of the present invention, reference should be made to the following detailed description taken together with the accompanying figures.

DETAILED DESCRIPTION OF THE INVENTION

Figure 1:
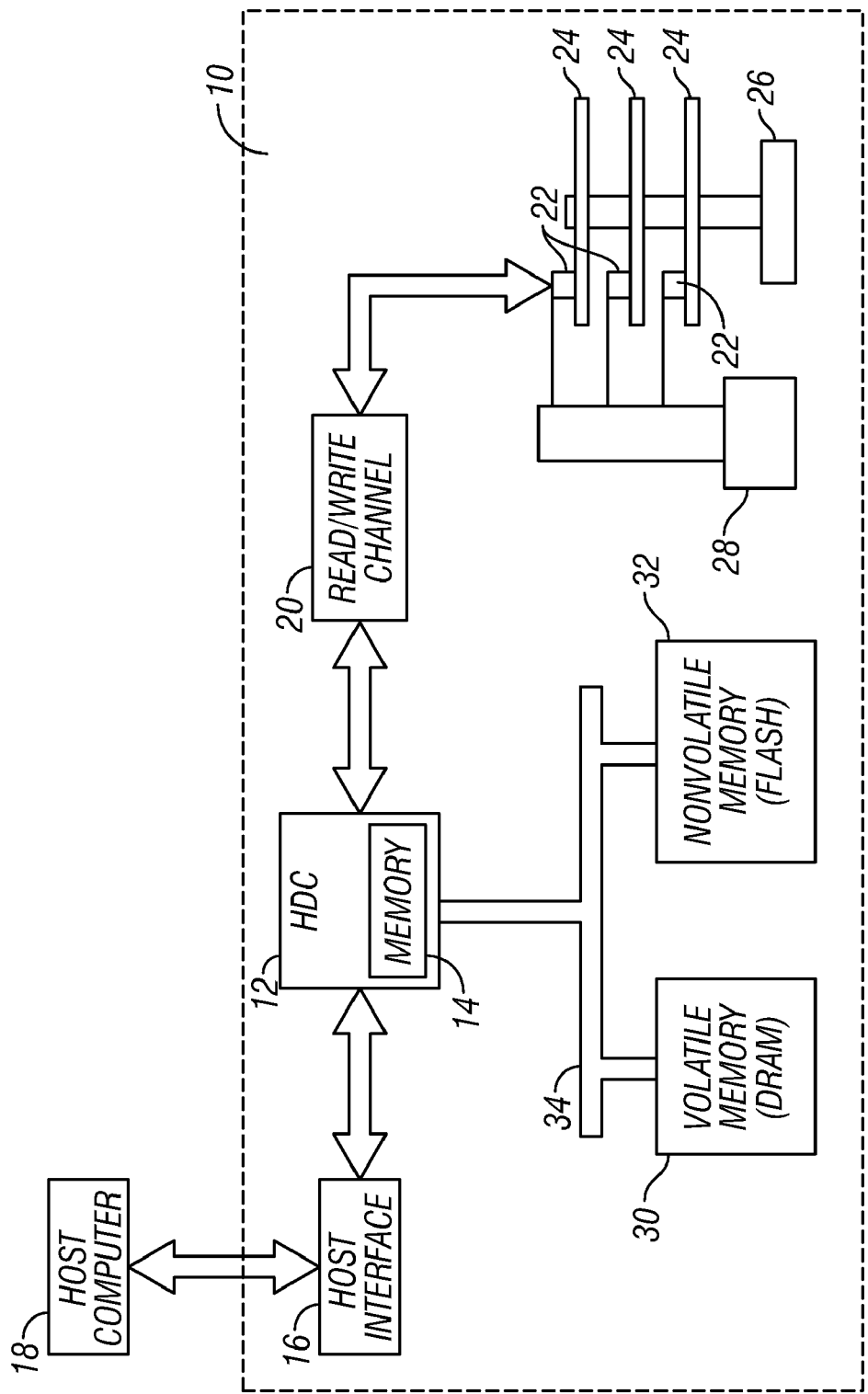
FIG. 1 is a block diagram of a magnetic recording hybrid hard disk drive (HDD) according to this invention.

FIG. 1 is a block diagram of a magnetic recording hybrid hard disk drive (HDD) 10 according to this invention. The HDD 10 includes a hard disk controller (HDC) 12 that can include and/or be implemented by a microcontroller or microprocessor. The controller 12 runs a computer program that is stored in memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host computer 18 may be a portable computer that can operate from battery power. The host interface 16 may be any conventional computer-HDD interface, such as Serial ATA (Advanced Technology Attachment) or SCSI (Small Computer System Interface).

The controller 12 is also connected to each of the HDD's read/write heads 22 through the read/write channel 20. The heads 22 move across the surfaces of the magnetic recording disks 24 to access the concentric data tracks. The HDD 10 typically includes a stack of disks 24 that are mounted on and rotated by a spindle motor 26, with each disk surface being associated with one of the heads 22. The heads 22 are moved across the concentric data tracks on the disk surfaces to the desired data tracks by an actuator 28.

The controller 12 acts as a data controller to receive blocks of write data from the host computer 18 and transfer the write data through the read/write channel 20 for writing to the disks 24 by the heads 22. The controller 12 also communicates with volatile memory 30 and nonvolatile memory 32 via data bus 34. One type of volatile memory 30 may be dynamic random access memory (DRAM). One type of nonvolatile memory 32 may be flash memory. Flash memory stores information in an array of floating gate transistors, called "cells", and can be electrically erased and reprogrammed in blocks. Because the HDD 10 includes two types of "permanent" data storage media, i.e., the nonvolatile memory 32 and the magnetic recording disks 24, it is sometimes called a "hybrid" disk drive.

In a HDD the speed at which data can be written to the disks is determined by a number of physical constraints. For example, if the head to do the writing is positioned over one area of its associated disk and the data is to be written at another area of the disk, there is a "seek time" delay for the head to be moved between the concentric data tracks. Also, there is a "rotational latency" delay required for the disk to rotate to the proper position relative to the head. Thus, the host computer must wait for the disk drive to complete the write operation. To reduce this waiting time the write data from the host computer 18 is first written into cache, i.e., the volatile memory 30 (typically DRAM). After the data has been written to the cache, the host computer can continue with operations without waiting until the write operation is complete. The write data is later removed or destaged from the cache and written to the disk. The controller 12 typically applies one of several well-known scheduling algorithms, based upon factors including seek time, rotational latency, and the size of the write cache, to determine which blocks of write data are removed from cache and the time at which the blocks are written to the disks.

When the hybrid HDD 10 is in "power-save" or "stand-by" mode with the disks not rotating, caching also takes place but the controller 12 directs the write data from the host computer 18 to the nonvolatile memory 32. Write data that is already stored in the volatile memory 30 when standby mode is initiated may also be transferred to the nonvolatile memory 32. This assures that the write data will not be lost if there is a loss of power to the HDD 10 during the power-save mode. This mode of operation allows the hybrid HDD 10 to receive write data from the host computer 18 without having to spin the disks back up, thereby conserving power and extending battery life, but without any risk of losing data in the event of a power failure.

Figure 2:
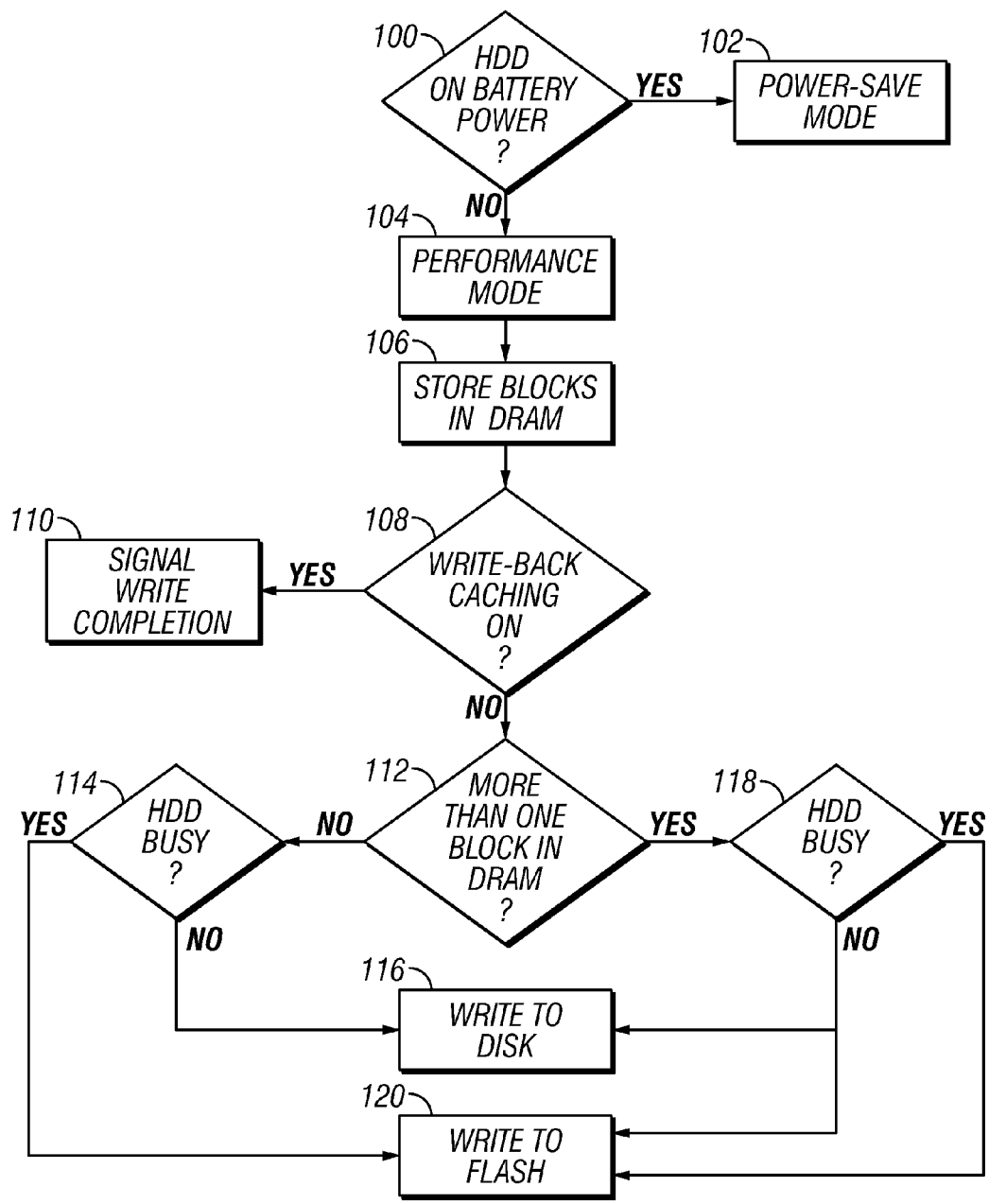
FIG. 2 is a flow chart for describing the algorithm of a first additional mode of operation of a hybrid HDD, called a "performance" mode.

In this invention, the hybrid HDD 10 includes at least one additional operational mode that utilizes the nonvolatile memory 32. FIG. 2 is a flow chart for describing the algorithm of a first additional non-standby mode, called a "performance" mode. The algorithm is implemented as a computer program or set of instructions executed by the controller 12. In the performance mode the disks are rotating, so performance mode and power-saving mode are mutually exclusive. Thus, at element 100 in FIG. 2, if battery power is on, the power-saving mode is selected at element 102, but if battery power is not on, the performance mode is initiated at element 104. Then, at element 106, as blocks of write data are received, the controller 12 stores them in DRAM (volatile memory 30). At element 108, if "write-back caching" is on, then the controller 12 sends a write completion signal to the host computer 18. Write-back caching is a conventional caching technique wherein write completion is signaled to the host computer as soon as all the write data are received in the DRAM, as indicated by element 110. If write-back caching is not on, then the caching technique may use "command queuing" in which multiple write commands from the host computer 18 are stored by the controller 12 in a queue until they are completed. If write-back caching is not on, the controller 12 can transfer the write data for one or more of these waiting commands into the DRAM at element 106, but not send a write completion signal to the host computer 18. At element 112, if there is only one block of write data in DRAM and the drive is not busy, meaning that there is no other read or write operation in process (element 114), then the block is destaged from DRAM and written to the disk (element 116). If the drive is busy at element 114, then the block of write data is destaged from DRAM and written to flash memory (element 120). However, if there is more than one block of write data in DRAM (element 112), and the drive is not busy (element 118) then one (or more) blocks can be written to the disk (element 116), and simultaneously one or more data blocks can be written from DRAM to flash (nonvolatile memory 32) (element 120). This parallel operation increases the throughput of moving write data from DRAM into some form of permanent storage media in the drive, either disk media or flash memory. If there is more than one block of write data in DRAM (element 112), and the drive is busy (element 118) then one (or more) blocks can be written from DRAM to flash (element 120).

The controller 12 may optionally apply one of several well-known scheduling algorithms or methods, based upon factors including seek time, rotational latency, and the number of blocks of write data in DRAM, to determine which blocks of write data are removed from DRAM and the time at which the blocks are written to the disks (element 116) and the flash memory (element 120). In one method, the writing is "random", so that when either the drive or the flash memory is not busy, one or the other is randomly selected as the destination for the block of write data. In a first-in first-out (FIFO) method, the writing is random, but the block of write data in DRAM that is written to either the disk or the flash memory is the block that was first written to DRAM.

The controller 12 may execute a rotational positioning optimization (RPO) scheduling algorithm or procedure to select the next bock of write data to be written to the disk. RPO algorithms are well-known and generally use both seek time and rotational latency to reorder the command queue. U.S. Pat. Nos. 5,991,825 and 6,418,510 describe representative RPO algorithms. The controller 12 may also execute other well-known scheduling algorithms, including shortest-seek-first (SSF), shortest-latency-first (SLF), and shortest-access-time-first (SATF).

The controller 12 may also use the logical block addresses (LBAs) associated with the blocks of write data to be written to flash memory. For example the controller may sort all of the write commands by LBA and select the blocks of write data for outlying LBAs (those that would required the longest seek time) as those to be written to flash memory. The controller may also select the blocks of write data for frequently accessed LBAs as those to be written to flash memory.

Figure 3:
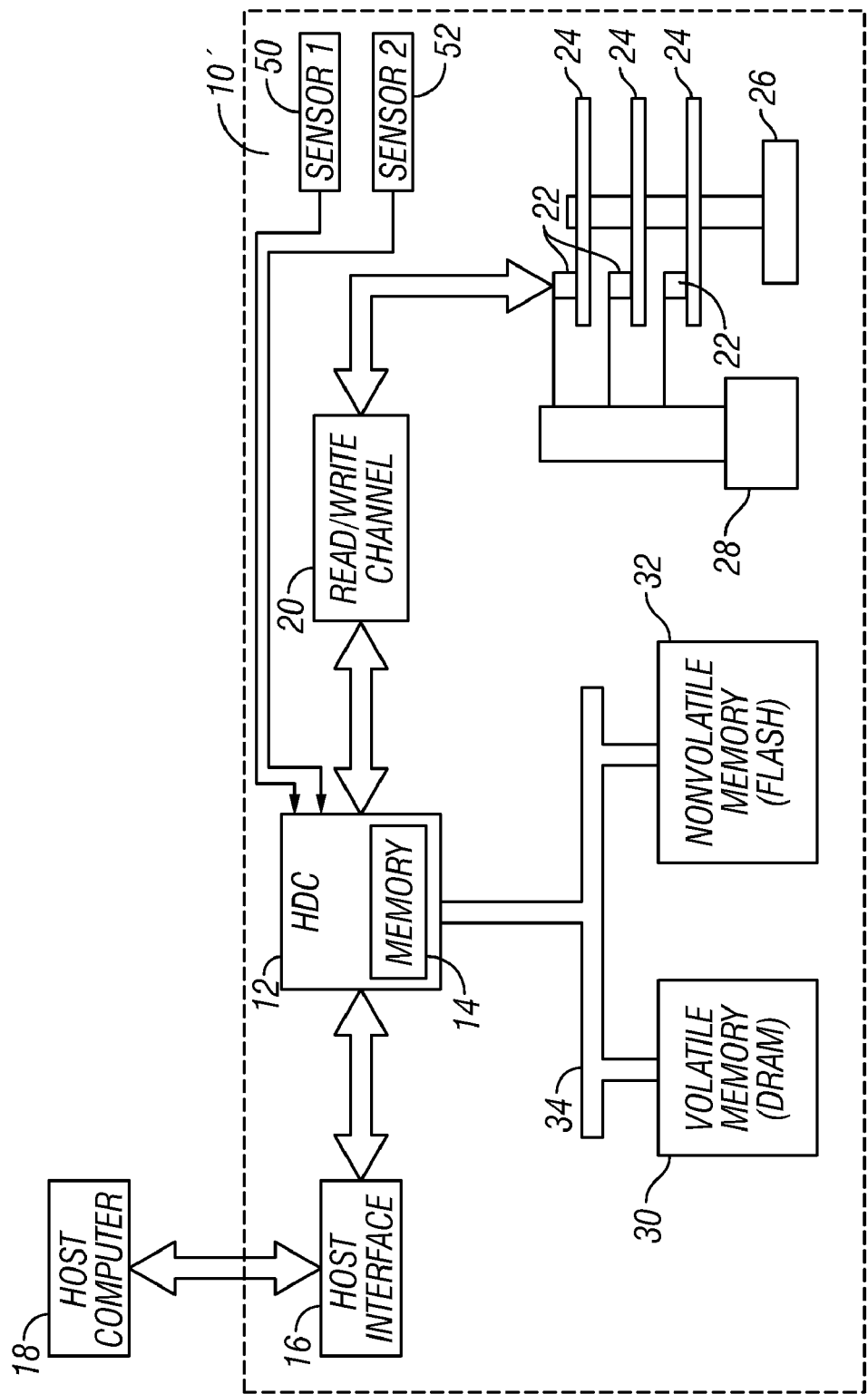
FIG. 3 is a block diagram of a magnetic recording hybrid HDD according to this invention, wherein the hybrid HDD includes one or more environmental sensors.
Figure 4:
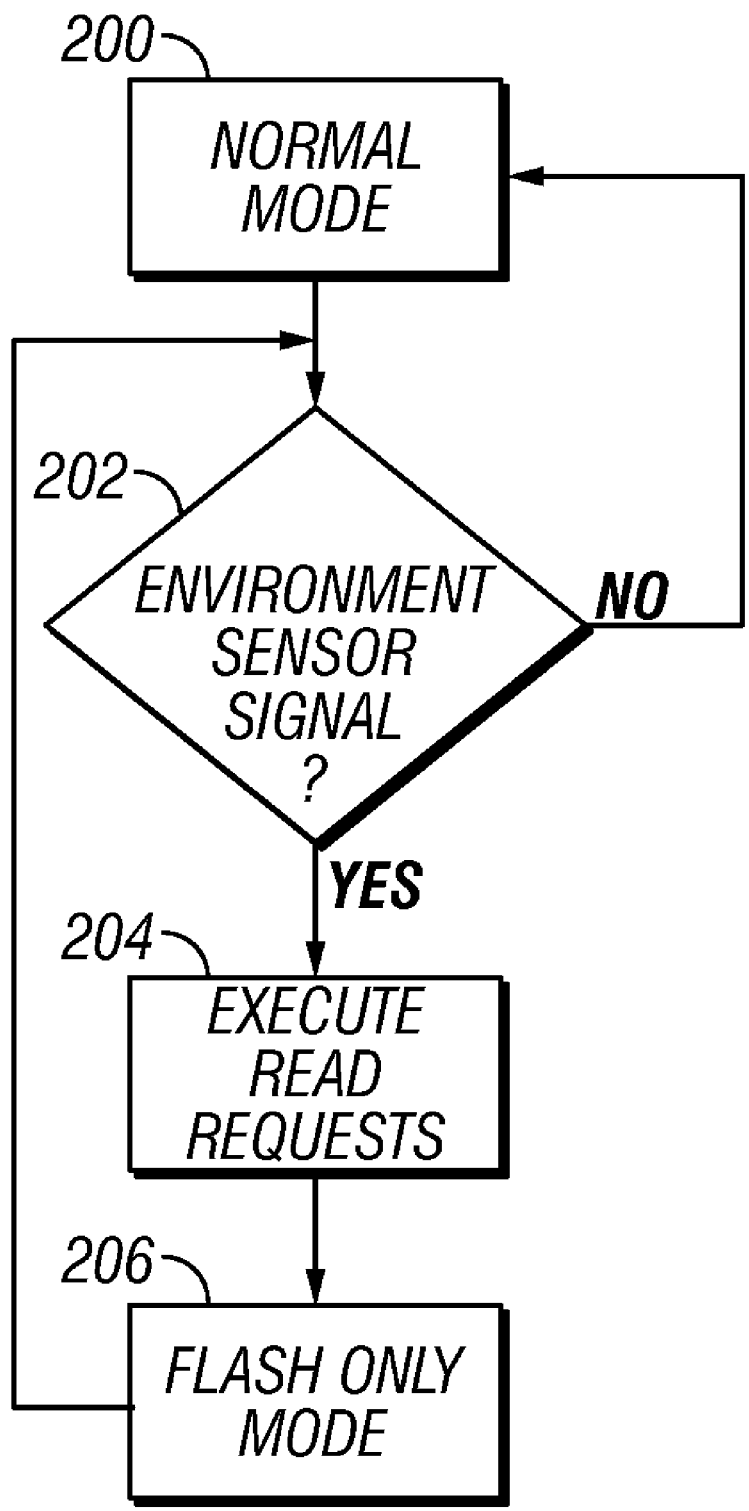
FIG. 4 is a flow chart for describing the algorithm of a second additional mode of operation of a hybrid HDD, called a "harsh-environment" mode, for the hybrid HDD of FIG. 3.

FIG. 3 is a block diagram of a magnetic recording hard disk drive (HDD) 10' according to this invention, wherein the hybrid HDD includes one or more environmental sensors. FIG. 4 is a flow chart for describing the algorithm of a second non-standby mode, called a "harsh-environment" mode, for hybrid HDD 10'. Under extreme or harsh environmental conditions, the HDD's spindle motor and actuator may not be able to operate properly. However, because the flash memory and controller can operate in environmental conditions well beyond the normal operating conditions of a conventional HDD, the hybrid HDD 10' can be configured to operate in a "flash-only" mode, wherein the flash memory temporarily replaces the disks as the permanent storage media.

The HDD 10' includes one or more environmental sensors, such as temperature sensor 50 and humidity sensor 52 that provide signals to controller 12. Signal conditioning circuitry or hardware (not shown), such as typical filters, comparators and A/D converters, may be located between the sensors 50, 52 and the controller 12. When the controller 12 detects a signal outside an acceptable range it switches to flash-only mode. The controller may also utilize logic to switch to flash-only mode when two or more sensors are outside an acceptable range, e.g., when the temperature is above a certain level and the humidity is above a certain level.

As shown in the flow chart of FIG. 4, the hybrid HDD 10' is operating in normal mode for a hybrid HDD, i.e., either the conventional mode (that does not utilize the nonvolatile memory) or the power-save mode (element 200). The controller 12 continuously monitors the signals from environmental sensors 50, 52 (element 202). If the controller 12 detects that one (or more) environmental signals are outside the acceptable range, indicating that it is not safe to rotate the disk or move the actuator, the controller 12 will switch to flash-only mode (element 206). However, because there may be read commands waiting to be executed, the controller will first read the requested data from the disks (element 204) before switching to flash-only mode. In flash-only mode the controller 12 will stop all read and write operations to the disks. Write data from host computer 18 (FIG. 3) will continue to be sent to DRAM (volatile memory 30) but will be destaged only to flash memory (nonvolatile memory 32). Read commands are either satisfied with data available in cache or nonvolatile memory if the data can be found there, or the commands are saved in a queue in the flash memory. When the controller 12 detects that the environmental conditions are again safe it switches back to normal mode (element 200). The write data stored in flash memory during the harsh-environment mode is written to the disks and the read commands stored in flash memory during the harsh-environment mode are executed to retrieve the requested read data from the disks.

Figure 5:
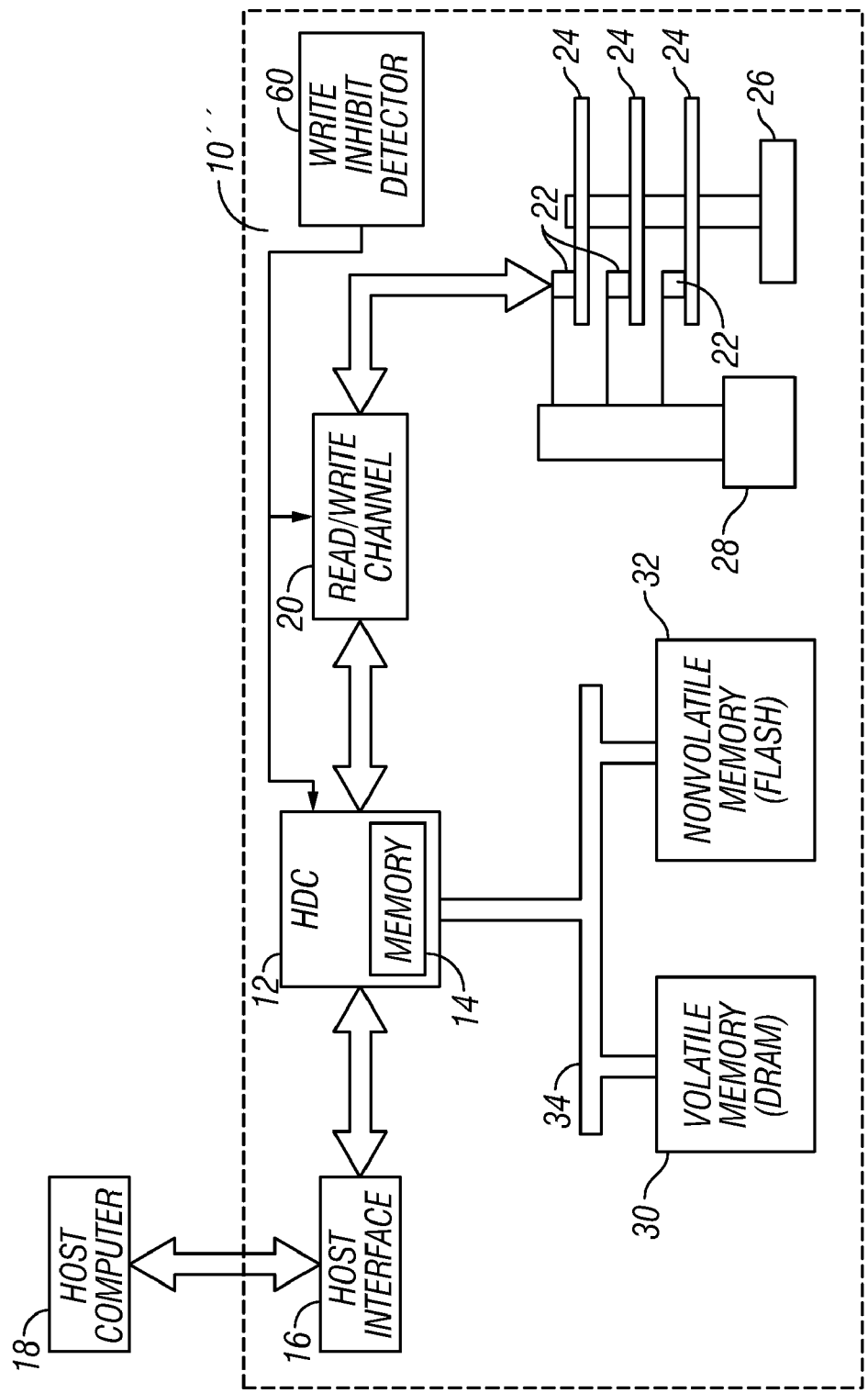
FIG. 5 is a block diagram of a magnetic recording hybrid HDD according to this invention, wherein the hybrid HDD includes one or more write-inhibit detectors.
Figure 6:
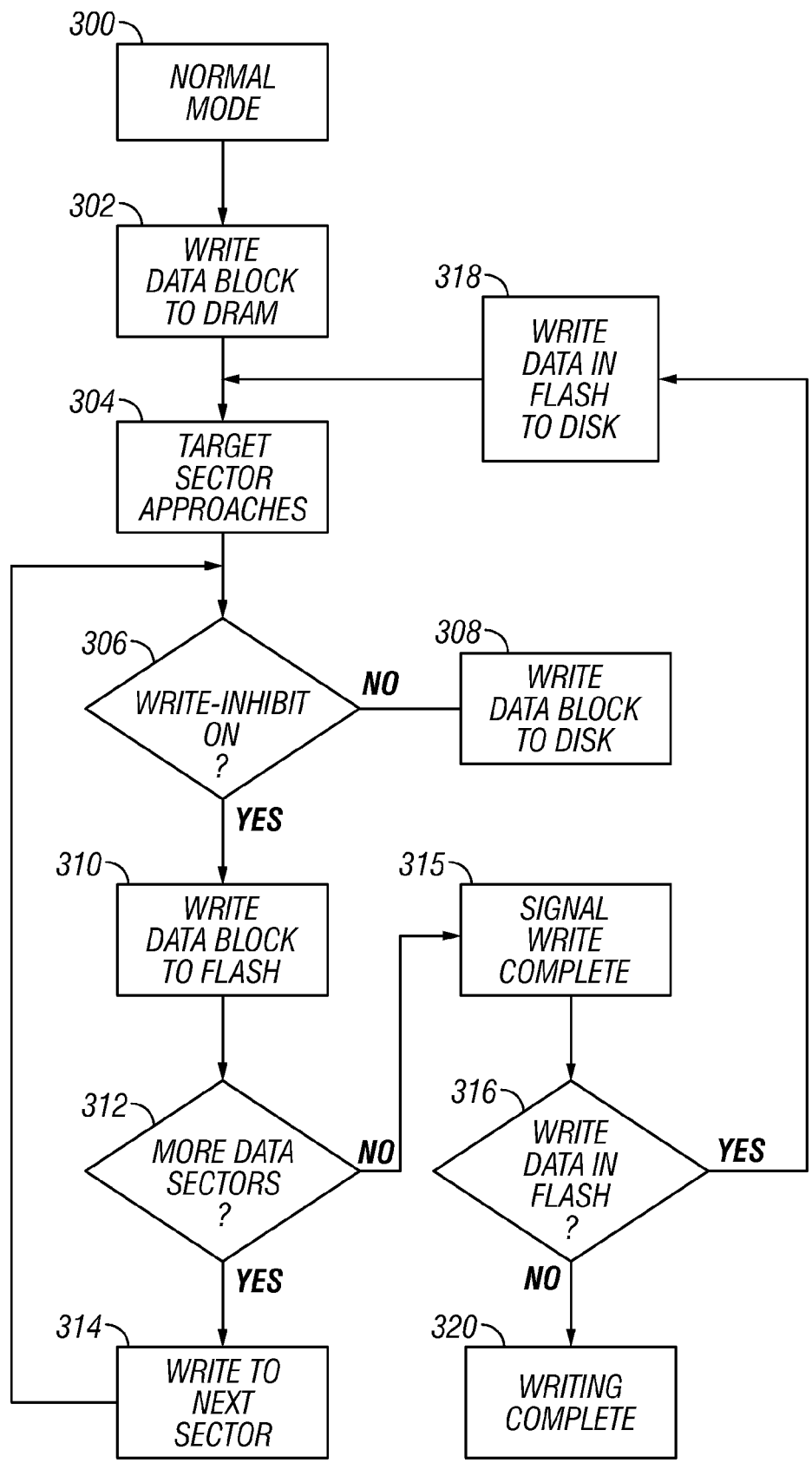
FIG. 6 is a flow chart for describing the algorithm of a third additional mode of operation of a hybrid HDD, called a "write-inhibit" mode, for the hybrid HDD of FIG. 5.

FIG. 5 is a block diagram of a magnetic recording hard disk drive (HDD) 10" according to this invention, wherein the hybrid HDD includes one or more write-inhibit detectors, such as shock sensor 60. FIG. 6 is a flow chart for describing the algorithm of a third non-standby mode, called a "write-inhibit" mode, for hybrid HDD 10". Disk drives typically include detectors and techniques to ensure that during writing of data to the disks the drive will not accidentally overwrite or corrupt data written on tracks adjacent to the intended or target track. Various detectors, such as shock sensors, may be incorporated into the disk drive to detect unsafe conditions for writing. U.S. Pat. No. 6,429,990 describes a disk drive with write-inhibit controlled by a shock sensor. The write-inhibit detector may also be a determination that the head position error signal (PES) from the disk drive's servo control system (the control system that maintains the head on the target track), has exceeded a predetermined threshold for a predetermined time. Various techniques for using the PES as a write-inhibit detector are known, as described for example in U.S. Pat. No. 6,882,489. A single detector may be used or the outputs of multiple detectors may be "OR'ed" together to control a write-inhibit circuit. The write-inhibit detector, such as shock sensor 60, signals data controller 12. However, as depicted schematically by the connection to read/write channel 20, the write-inhibit detector also signals the write driver to prevent write current from reaching the write heads 22.

The write-inhibit signal must be off before write current is allowed to be sent to the write head for writing. After the head has been moved to the target track where data is to be written, then when the target sector on the track is coming under the write head but write-inhibit is on, writing to the target sector can not proceed. The drive must wait for at least one complete disk rotation before it can again attempt writing to the target sector. Sometimes it may take multiple disk rotations before conditions are acceptable for the write-inhibit to turn off and allow the writing to proceed. This wait time has a significant impact on performance. With the write-inhibit mode of operation of the hybrid disk drive of this invention, the flash memory is used to eliminate the performance penalty caused by write-inhibit.

As shown in the flow chart of FIG. 6, the hybrid HDD 10" is operating in normal mode for a hybrid HDD, i.e., either the conventional mode or the power-save mode (element 300). Write data from the host computer 18 (FIG. 5) is written into DRAM (volatile memory 30) by controller 12 (element 302). The controller 12 prepares to destage the block of write data from DRAM to the disk as the target sector on the target track approaches the write head (element 304). If the write-inhibit signal is off at element 306, then the write data is written to the disk (element 308). However, if the write-inhibit signal is on at element 306, then the write data is written to the flash memory (nonvolatile memory 32) at element 310, thereby avoiding the penalty of waiting for additional disk rotations to determine if the write-inhibit signal is off. The controller 12 then determines if the block of write data is to be written to additional sectors (element 312). If there are additional sectors to be written to (element 312) then the next sector is written to (element 314) and the algorithm returns to element 306. If there are no more sectors to be written to, i.e., the block of write data has been completely written, either to the disks or to flash memory, then the controller 12 signals to the host write completion (element 315). Next, the controller 12 determines if any portion of the write data is in flash memory (element 316). If there is write data in flash memory, then the controller 12 attempts to write the data to the disk (element 318). This can occur when the disk drive is idle. When no more write data is in flash memory, then writing has been completed (element 320).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive comprising:
   a rotatable recording disk for the storage of data from a host computer;
   a data controller adapted for connection to the host computer for transferring data from the host computer to the disk and capable of receiving a write inhibit signal;
   volatile memory connected to the controller for temporary storage of data prior to transfer to the disk; and
   nonvolatile memory connected to the controller;
   the controller having a first mode of operation that includes writing data to the nonvolatile memory when the disk is not rotating, and a second mode of operation that includes (a) writing data to the nonvolatile memory when the disk is rotating and (b) destaging write data from the volatile memory to the nonvolatile memory if the controller detects a write-inhibit signal.

2. The disk drive of claim 1 wherein the data from the host computer comprises blocks of write data to be written to the disk, and wherein the second mode of controller operation includes storing multiple blocks in the volatile memory and destaging a first block from the volatile memory to the rotating disk and a second block from the volatile memory to the nonvolatile memory.

3. The disk drive of claim 2 wherein destaging blocks of write data from the volatile memory to the nonvolatile memory includes destaging according to a first-in first-out (FIFO) procedure.

4. The disk drive of claim 2 wherein destaging blocks of write data from the volatile memory to the rotating disk includes destaging according to a disk rotational positioning optimization (RPO) procedure.

5. The disk drive of claim 1 wherein the disk drive further comprises an environmental sensor for signaling the data controller, and wherein the second mode of controller operation includes destaging write data from the volatile memory to the nonvolatile memory when the data controller detects a signal from said environmental sensor.

6. The disk drive of claim 1 wherein the second mode of controller operation includes, after the write data has been destaged to the nonvolatile memory if the controller detected a write-inhibit signal, transferring the write data from the nonvolatile memory to the disk if the controller does not detect a write-inhibit signal.

7. The disk drive of claim 1 further comprising a shock sensor coupled to the controller for generating the write-inhibit signal.

8. The disk drive of claim 1 wherein the disk includes concentric data tracks for the storage of data, wherein the disk drive includes a head for writing data to the data tracks and a servo control system coupled to the head for measuring a position error signal (PES) of the head on a data track, and wherein the controller detects a write-inhibit signal when the value of the PES exceeds a predetermined value for a predetermined time period.

9. A magnetic recording disk drive comprising:
   a rotatable magnetic recording disk for the storage of blocks of write data from a host computer, the disk having a plurality of concentric data tracks;
   a write head movable across the surface of the disk for writing the blocks of write data on the disk;
   a data controller adapted for connection to the host computer for transferring the blocks of write data from the host computer to the write head for writing on the disk;
   volatile memory connected to the controller for temporary storage of the blocks of write data prior to writing on the disk; and
   nonvolatile memory connected to the controller; and
   wherein the controller comprises logic for executing method acts of:
   in a standby mode of operation wherein the disk is not rotating transferring blocks of write data from the host computer to the volatile memory and then destaging blocks of write data from the volatile memory to the nonvolatile memory; and in a non-standby mode of operation wherein the disk is rotating transferring blocks of write data from the host computer to the volatile memory, destaging at least a portion of the blocks of write data from the volatile memory to the nonvolatile memory, and thereafter transferring blocks of write data from the nonvolatile memory to the disk; wherein the non-standby mode of controller operation is a performance mode including storing multiple blocks in the volatile memory and destaging a first block from the volatile memory to the rotating disk and a second block from the volatile memory to the nonvolatile memory according to a first-in first-out (FIFO) procedure.

10. The disk drive of claim 9 wherein the volatile memory comprises DRAM and the nonvolatile memory comprises flash memory.

11. A disk drive comprising:
   a rotatable recording disk for the storage of blocks of data from a host computer;
   a data controller adapted for connection to the host computer for transferring blocks of data from the host computer to the disk;
   volatile memory connected to the controller for temporary storage of blocks of data prior to transfer to the disk; and
   nonvolatile memory connected to the controller;
   the controller having a first mode of operation that includes writing blocks of data to the nonvolatile memory when the disk is not rotating, and a second mode of operation that includes storing multiple blocks of data in the volatile memory and destaging a first block from the volatile memory to the rotating disk and a second block from the volatile memory to the nonvolatile memory, wherein destaging blocks from the volatile memory to the nonvolatile memory includes destaging according to a procedure selected from (a) a first-in first-out (FIFO) procedure and (b) a disk rotational positioning optimization (RPO) procedure.

12. A disk drive comprising:
a rotatable recording disk for the storage of data from a host computer;
a data controller adapted for connection to the host computer for transferring data from the host computer to the disk;
an environmental sensor for signaling the data controller;
volatile memory connected to the controller for temporary storage of data prior to transfer to the disk; and
nonvolatile memory connected to the controller;
the controller having a first mode of operation that includes writing data to the nonvolatile memory when the disk is not rotating, and a second mode of operation that includes (a) writing data to the nonvolatile memory when the disk is rotating and (b) destaging write data from the volatile memory to the nonvolatile memory when the data controller detects a signal from said environmental sensor.

13. A magnetic recording disk drive comprising:
a rotatable magnetic recording disk for the storage of blocks of write data from a host computer, the disk having a plurality of concentric data tracks;
a write head movable across the surface of the disk for writing the blocks of write data on the disk;
a data controller adapted for connection to the host computer for transferring the blocks of write data from the host computer to the write head for writing on the disk;
volatile memory connected to the controller for temporary storage of the blocks of write data prior to writing on the disk; and
nonvolatile memory connected to the controller, and
wherein the controller comprises logic for executing method acts of:
in a standby mode of operation wherein the disk is not rotating transferring blocks of write data from the host computer to the volatile memory and then destaging blocks of write data from the volatile memory to the nonvolatile memory; and in a non-standby mode of operation wherein the disk is rotating transferring blocks of write data from the host computer to the volatile memory, destaging at least a portion of the blocks of write data from the volatile memory to the nonvolatile memory, and thereafter transferring blocks of write data from the nonvolatile memory to the disk; wherein the non-standby mode of controller operation is a performance mode including storing multiple blocks in the volatile memory and destaging a first block from the volatile memory to the rotating disk and a second block from the volatile memory to the nonvolatile memory according to a disk rotational positioning optimization (RPO) procedure.

14. A magnetic recording disk drive comprising:
a rotatable magnetic recording disk for the storage of write data from a host computer, the disk having a plurality of concentric data tracks;
a write head movable across the surface of the disk for writing the write data on the disk;
a data controller adapted for connection to the host computer for transferring the write data from the host computer to the write head for writing on the disk;
an environmental sensor for signaling the data controller;
volatile memory connected to the controller for temporary storage of the write data prior to writing on the disk; and
nonvolatile memory connected to the controller; and
wherein the controller comprises logic for executing method acts of:
in a standby mode of operation wherein the disk is not rotating transferring write data from the host computer to the volatile memory and then destaging write data from the volatile memory to the nonvolatile memory; and in a non-standby mode of operation wherein the disk is rotating transferring write data from the host computer to the volatile memory, destaging at least a portion of the write data from the volatile memory to the nonvolatile memory, and thereafter transferring the write data from the nonvolatile memory to the disk; wherein the non-standby mode of controller operation is a harsh-environment mode including destaging write data from the volatile memory to the nonvolatile memory when the data controller detects a signal from said environmental sensor.

15. A magnetic recording disk drive comprising:
a rotatable magnetic recording disk for the storage of write data from a host computer, the disk having a plurality of concentric data tracks;
a write head movable across the surface of the disk for writing the write data on the disk;
a data controller adapted for connection to the host computer for transferring the write data from the host computer to the write head for writing on the disk, the controller being capable of receiving a write inhibit signal;
volatile memory connected to the controller for temporary storage of the write data prior to writing on the disk; and
nonvolatile memory connected to the controller; and
wherein the controller comprises logic for executing method acts of:
in a standby mode of operation wherein the disk is not rotating transferring write data from the host computer to the volatile memory and then destaging write data from the volatile memory to the nonvolatile memory; and in a non-standby mode of operation wherein the disk is rotating transferring write data from the host computer to the volatile memory, destaging at least a portion of the write data from the volatile memory to the nonvolatile memory, and thereafter transferring the write data from the nonvolatile memory to the disk; wherein the non-standby mode of controller operation is a write-inhibit mode including destaging write data from the volatile memory to the nonvolatile memory if the controller detects a write-inhibit signal and, after the write data has been destaged to the nonvolatile memory if the controller detected a write-inhibit signal, transferring the write data from the nonvolatile memory to the disk if the controller does not detect a write-inhibit signal.

16. The disk drive of claim 15 further comprising a shock sensor coupled to the controller for generating the write-inhibit signal.

17. The disk drive of claim 15 wherein the disk drive includes a servo control system coupled to the head for measuring a position error signal (PES) of the head on a data track, and wherein the controller detects a write-inhibit signal when the value of the PES exceeds a predetermined value for a predetermined time period.

* * * * *